United States Patent [19]

Iwama

[11] Patent Number: 5,450,215
[45] Date of Patent: Sep. 12, 1995

[54] COLOR READING APPARATUS AND METHOD TO READ ENHANCED COLOR SIGNALS BY REMOVING AFTERGLOW ELECTRIC CHARGES

[75] Inventor: Ryouichi Iwama, Kawasaki, Japan

[73] Assignee: Fujitsu Limited, Kawasaki, Japan

[21] Appl. No.: 289,584

[22] Filed: Aug. 15, 1994

[30] Foreign Application Priority Data

Nov. 19, 1993 [JP] Japan .................................. 5-290446

[51] Int. Cl.⁶ .............................................. H04N 1/04
[52] U.S. Cl. ..................................... 358/509; 358/475
[58] Field of Search .............. 358/505, 509, 510, 513, 358/514, 475; 355/326 R; H04N 1/04

[56] References Cited

U.S. PATENT DOCUMENTS

| | | | |
|---|---|---|---|
| 4,652,913 | 3/1987 | Saitoh et al. | 358/509 |
| 4,731,661 | 3/1988 | Nagano | 358/509 |
| 5,296,944 | 3/1994 | Suzuki et al. | 358/509 |
| 5,325,153 | 6/1994 | Mitsuse et al. | 355/326 R |

Primary Examiner—Edward L. Coles, Sr.
Assistant Examiner—Kim Yen Vu
Attorney, Agent, or Firm—Staas & Halsey

[57] ABSTRACT

A color reading apparatus comprises a light source section, an electric charge accumulating section, a signal generating section and an electric charge disposal section. The light source section effects irradiations and non-irradiations of a R light beam, a G light beam and a B light beam in sequence. The electric charge accumulating section accumulates electric charges per light beam by receiving the respective light beams irradiated sequentially by the light source section. The signal generating section generates a first reading signal for reading the accumulation electric charge of the electric charge accumulating section during the irradiation of each light beam and, at the same time, generates a second reading signal for reading an afterglow electric charge of the electric charge accumulating section during the non-irradiation of each light beam. The electric charge disposal section disposes of an afterglow electric charge in the accumulation electric charge read by the first reading signal generated by the signal generating section and the afterglow electric charge read by the second reading signal generated by the signal generating section.

24 Claims, 11 Drawing Sheets

COLOR READING APPARATUS AND METHOD TO READ ENHANCED COLOR SIGNALS BY REMOVING AFTERGLOW ELECTRIC CHARGES

BACKGROUND OF THE INVENTION

1. Field of the Invention

The present invention relates to a color reading apparatus for and a color reading method of reading color signals on the basis of a R light beam, a G light beam and a B light beam by use of light sources and a charge coupled device. The present invention is effective especially in a color scanner and a color copier which employ gradation data.

2. Description of the Related Art

The color scanner is generally used as a color reading apparatus. This color scanner has a photoelectric converting device such as a charge coupled device (hereinafter abbreviated to a CCD). This CCD accumulates an electric charge through a beam of light reflected by a copy and reads the accumulation electric charge in the form of a color signal. When this CCD is employed for the color reading apparatus, a quantity of the accumulated electric charges is small for a quantity of light received from the copy. That is, a sensitivity of the CCD is poor. For this reason, a variety of color reading apparatuses are adopted to enhance the sensitivity of this CCD.

These color reading apparatuses are, e.g., a color filter switching apparatus, a color CCD apparatus and a prism separation apparatus.

First, the color filter switching apparatus includes a hot-cathode ray tube or a cold-cathode tube for irradiating a copy with a beam of white light and a mirror for reflecting the light reflected from the copy toward a lens. The color filter switching apparatus has a CCD for receiving the light from the lens and color filters, disposed between the mirror and the lens, for separating the light. Then, the color filter switching apparatus separates the white light of the hot-cathode ray tube which exhibits a large light quantity into the R light beam, the G light beam and the B light beam by switching over the above color filters in the sequence of R, G and B. This color filter switching apparatus is classified into two types, i.e., a slide type and a rotary type.

A scanning method through the CCD is classified into two methods, viz., a linear sequential scanning method and a surface sequential scanning method. The linear sequential scanning method is a method of switching over the filter every time a one-line scan is effected on the copy. The surface sequential scanning method is a method of switching over the filter per surface of the copy and simultaneously performing the scan three times. According to this scanning method, a CCD for monochrome is employed as it is, and, therefore, the costs become comparatively low. This scanning method, however, has a drawback in which a reading speed is relatively slow.

Next, in the color CCD apparatus, the color filters transmitting a RGB light beam are provided on the surface of the CCD. These color filters work to separate the white light reflected from the copy into the R light beam, the G light beam and the B light beam, respectively.

This color CCD apparatus is capable of reading the accumulation electric charge at a high speed. Further, down-sizing of the apparatus is also attainable. There exist, however, such defects that a focal depth thereof is small, and scatters in terms of sensitivity are produced per sensor and per color.

Besides, the prism separation apparatus incorporates a lens, CCDs for respective light beams and a prism disposed between the lens and the CCDs. Then, a refractive index of the prism varies corresponding to respective wavelengths of the R light beam, the G light beam and the B light beam, and hence the reflected/refracted light from the copy can be separated into the respective light beams. This prism separation apparatus is capable of reading the accumulation electric charge at the high velocity and has a large focal depth.

An optical system thereof has to be, however, designed with a high accuracy so that the CCDs for the respective light beams read the same copy surface at all times. Further, the prism separation apparatus presents defects in which the costs become relatively high, and the apparatus increases in size.

Moreover, the above-mentioned color filter switching apparatus, the color CCD apparatus and the prism separation apparatus have the following problems. In these apparatuses, if the hot-cathode ray tube and the cold-cathode tube having the white light are employed as light sources, a stabilizing time of a rising light quantity increases. The temperature changes linearly with respect to the light quantity, and the light source is blackened due to the use of mercury. There is also a defect in which the infrared ray augments because of argon gas when the temperature is low.

Further, the light source of the hot-cathode ray tube or the cold-cathode tube is bad in terms of the rising characteristic of the light quantity. The light source has to be always in an operating status while reading a copy for one page.

Under such circumstances, a rare gas fluorescent lamp obviating the defects given above has been employed in recent years. The rare gas fluorescent lamp has a smaller light quantity than the light quantity of the hot- or cold-cathode tube. The rare gas fluorescent lamp is better in terms of the rising characteristic of the light quantity than in the hot- and cold-cathode tubes. For this reason, the rare gas fluorescent lamp has been used for a RGB three-light-source switching apparatus.

The three-light-source switching apparatus separates the R light beam, the G light beam and the B light beam by sequentially switching over the R light source, the G light source and the B light source. This apparatus obtains a color signal composed of a R signal, a G signal and a B signal from the R light beam, the G light beam and the B light beam through the same CCD. Accordingly, there disappear problems in terms of an image matching and a color difference.

The color reading apparatus using the three-light-source switching apparatus is, however, incapable of taking gradations of a low-density region and a high-density region due to an afterglow of the fluorescent lamp and an afterglow of the CCD. Hence, the image obtained exhibits an ill-contrasted image quality on the whole.

Supposing, for example, that the copy changes from a bright portion (while) to a dark portion (black), it is desirable that an analog output of the CCD in this case be, e.g., 100 in the bright portion but be 0 in the dark portion.

However, the afterglow of the CCD is on the order of several % (2 through 8%) of the light accumulated in the CCD. For instance, the afterglow of the CCD is 5% of the light accumulated therein, the CCD output changes from 100 to 5. For this reason, a color is produced in the dark portion of the CCD output when the copy changes from the bright portion to the dark portion. Alternatively, in reverse to this, the color is produced in the bright portion. Consequently, the contrast decreases on the whole.

Further, the decrease in the contrast is caused even by the afterglow of the light source. That is, the problem is that the accurate CCD output can not be obtained because of the afterglow output being superposed on the original CCD output due to the afterglows of the light source and of the CCD.

SUMMARY OF THE INVENTION

It is a primary object of the present invention provide a color reading apparatus and a color reading method which are capable of reading an enhanced color signal without depending on an afterglow characteristic of a CCD.

The color reading apparatus according to the present invention comprises a light source section, an electric charge accumulating section, a signal generating section and an electric charge disposal section. The light source section effects irradiations and non-irradiations of a R light beam, a G light beam and a B light beam in sequence. The electric charge accumulating section accumulates an electric charge per light beam by receiving the respective light beams irradiated sequentially by the light source section.

The signal generating section generates a first reading signal for reading the accumulation electric charge of the electric charge accumulating section during the irradiation of each light beam and, at the same time, generates a second reading signal for reading an afterglow electric charge of the electric charge accumulating section during the non-irradiation of each light beam. The electric charge disposal section disposes of the afterglow electric charge in the accumulation electric charge read by the first reading signal generated by the signal generating section and the afterglow electric charge read by the second reading signal generated by the signal generating section.

The light source section has a R light source for irradiating the R light beam, a G light source for irradiating the G light beam, a B light source for irradiating the B light beam and a light source switching section. The light source switching section sets a lighting time and an extinguishing time of each light source and, at the same time, sequentially switches over the respective light sources.

Herein, each of the three light sources is, e.g., a rare gas fluorescent lamp which is excellent in terms of a rising characteristic and a temperature characteristic as well. The electric accumulating section is, e.g., a CCD.

The signal generating section generates, e.g., trigger signals composed of continuous pulses as first and second reading signals. The light source switching section is, e.g., a changeover switch.

Further, the light source switching section may set longer the lighting time of each light source as an absolute light quantity of each light source decreases. The absolute light quantity differs per light source, and, therefore, the light quantity of each light source becomes fixed by changing the lighting time per light source.

The light source switching section may set the lighting times of the respective light sources to the same value and thereby sets a duty ratio of the lighting time with respect to a total sum of the lighting times and the extinguishing times of the respective light sources in accordance with each of the light sources.

The light source switching section includes a turn-on signal section and a selecting section. The turn-on signal section generates a turn-on signal composed of continuous pulses for sequentially turning on the respective light sources in synchronism with the second reading signal. The selecting section sequentially selects the continuous pulses of the turn-on signal and supplies each light source with the continuous pulses.

Further, the light source switching section includes three turn-on signal sections and three turn-on sections. Each of the three turn-on signal sections is provided corresponding to each light source and generates a turn-on-signal for turning on the corresponding light source in synchronism with the second reading signal. Each of the three turn-on sections is provided corresponding to each turn-on signal section and supplies the corresponding light source with the turn-on signal from the corresponding turn-on signal section.

Moreover, the electric charge disposal section includes an electric charge extracting section for extracting the accumulation electric charge read by the first reading signal generated by the signal generating section.

The first reading signal for reading the accumulation electric charge synchronizes with a timing for turning off each light source to read the accumulation electric charge during the extinguishing time of the light source. The second reading signal for reading the afterglow electric charge synchronizes with a timing for turning on each of the light sources to read the afterglow electric charge during the lighting time of the next light source.

Additionally, the color reading apparatus further comprises an electric charge accumulation driving section. The electric charge accumulation driving section reads the electric charge during the extinguishing time of the light source by using the first reading signal and reads the afterglow electric charge during the lighting time of the next light source by using the second reading signal.

Further, a color reading method according to the present invention comprises a light source step, an electric charge accumulating step, a signal generating step and an electric charge disposal step. The light source step is to effect irradiations and non-irradiations of a R light beam, a G light beam and a B light beam in sequence.

The electric charge accumulating step is to accumulate an electric charge per light beam by receiving the respective light beams irradiated in sequence.

The signal generating step is to generate a first reading signal for reading the accumulation electric charge during the irradiation of each light beam and, at the same time, generate a second reading signal for reading an afterglow electric charge during the non-irradiation of each light beam. The electric charge disposal step is to dispose of the afterglow electric charge in the accumulation electric charge read by the first reading signal generated and the afterglow electric charge read by the second reading signal generated.

According to the color reading apparatus of this invention, first, the light source switching section sets the lighting time and the extinguishing time and switches over the respective light sources in sequence.

Hereupon, a certain light source is turned on and then turned off.

Then, the electric charges are accumulated by the lighting beam of each light source, the afterglow beam of the light source and the afterglow beam of the electric charge accumulating section. Further, the signal generating section generates the first reading signal for reading the accumulation electric charge of the electric charge accumulating section by the turn-on of each light source. The signal generating section generates the second reading signal for reading the afterglow electric charge of the electric charge accumulating section by the turn off of each light source.

The accumulation electric charge and the afterglow electric charge are read by the first and second reading signals. The electric charge disposal section disposes of the afterglow electric charge in the accumulation electric charge and the afterglow electric charge.

That is, the afterglow electric charge disappears, and the enhanced color signal can be obtained by reading the electric charge relative to the lighting beam.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

The present invention will hereinafter be described by way of specific embodiments.

<Embodiment 1>

Figure 1:
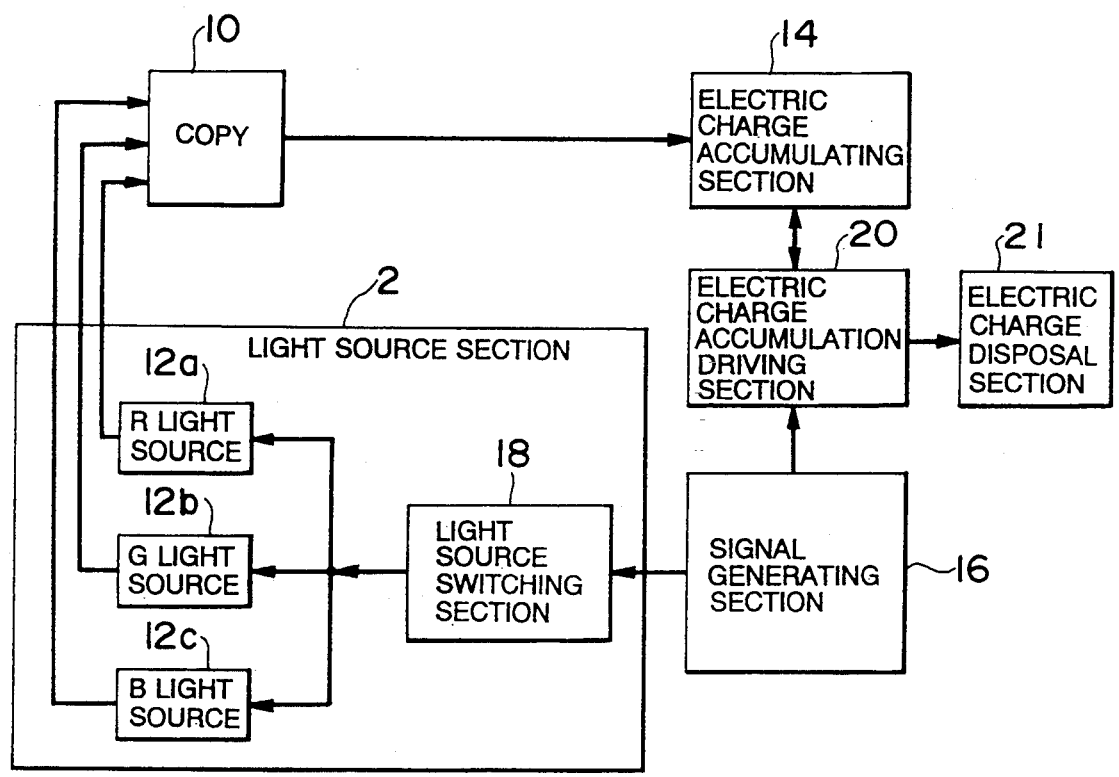
FIG. 1 is a block diagram illustrating a construction of a color reading apparatus in accordance with an embodiment 1 of the present invention.

FIG. 1 is a block diagram illustrating a construction of a color reading apparatus in accordance with an embodiment 1 of the present invention. A color reading apparatus includes a light source section 2, a color-printed copy 10 and an electric charge accumulating section 14. The color reading apparatus also includes a signal generating section 16 connected to the light source section 2, an electric charge accumulation driving section 20 connected to the signal generating section 16 and to the electric charge accumulating section 14 and also an electric charge disposal section 21 connected to the electric charge accumulation driving section 20.

The light source section 2 effects irradiations and non-irradiations of of a R light beam, a G light beam and a B light beam in sequence on the copy 10. The light source section 2 has a R light source 12a for irradiating the R light beam, a light source 12b for irradiating the G light beam, a B light source 12c for irradiating the B light beam and a light source switching section 18 connected to these three light sources.

The light source switching section 18 sets a lighting time and an extinguishing time of each of the light sources 12a–12c and, at the same time, switches over the respective light sources in sequence. Herein, each of the three light sources is, e.g., a rare gas fluorescent lamp which is excellent in terms of a rising characteristic and a temperature characteristic as well.

The electric charge accumulating section 14, on receiving the respective light beams reflected sequentially from the copy 10, accumulates the electric charge per light beam. The signal generating section 16 generates a first reading signal for reading the accumulated electric charge of the electric charge accumulating section 14 during the irradiation of the light beam and, at the same time, generates a second reading signal for reading an afterglow electric charge of the electric charge accumulating section 14 during the non-irradiation of each light beam. The light source switching section 18 switches over each light source on the basis of the first and second reading signals.

The electric charge accumulation driving section 20 reads the accumulated electric charge from the electric charge accumulating section 14 on the basis of the first reading signal generated by the signal generating section 16. The electric charge accumulation driving section 20 then reads the afterglow electric charge from the electric charge accumulating section 14 on the basis of the second reading signal. The electric charge disposal section 21 disposes of the afterglow electric charge in the accumulation and afterglow electric charges read by the electric charge accumulation driving section 20.

Figure 2:
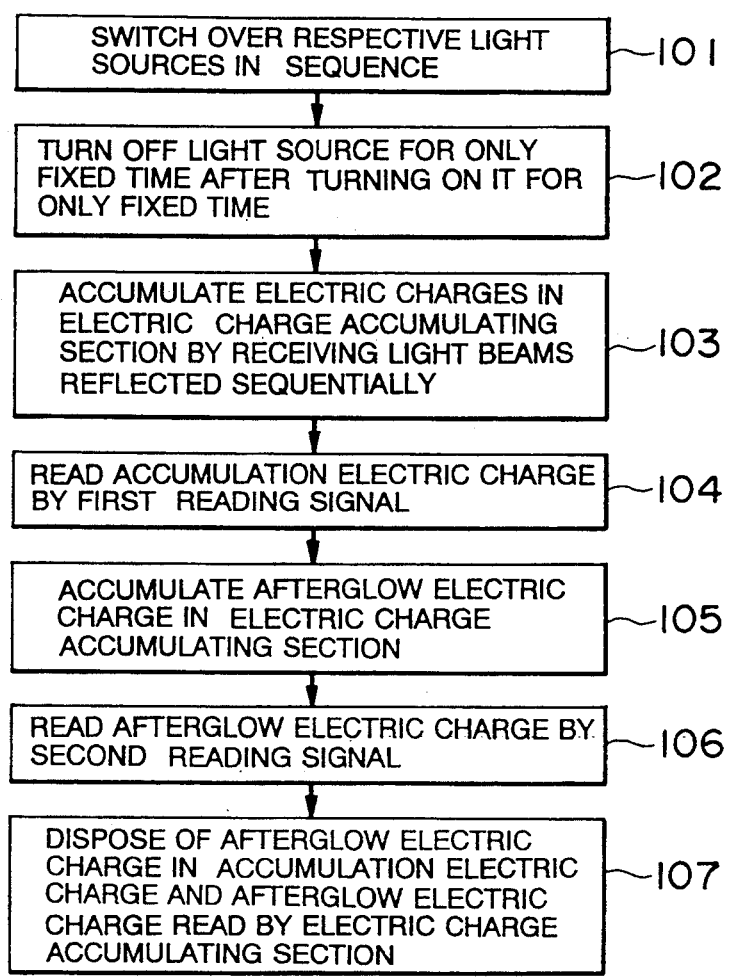
FIG. 2 is a flowchart showing a color reading method in accordance with the embodiment 1 of this invention.

Next, a color reading method in accordance with the embodiment 1 will be explained with reference to a flowchart of FIG. 2. First, the signal generating section 16 outputs the first and second reading signals to the light source switching section 18 and the electric charge accumulation driving section 20.

The light source switching section 18 sequentially switches over the respective light sources on the basis of the first and second reading signals transmitted from the signal generating section 16 (step 101). Each light source is turned on for only a fixed time and irradiates the copy 10 with the light beam. Further, each light source is turned off for a fixed time but does not irradiate the copy 10 with the light beam (step 102).

Next, the electric charge accumulating section 14 receives the respective light beams reflected in sequence from the copy 10 and accumulates the electric charges (step 103). The electric charge accumulation driving section 20 reads the accumulation electric charge accumulated in the electric charge accumulating section 14 in accordance with the first reading signal (step 104).

Further, the electric charge accumulating section 14 accumulates the afterglow electric charges produced when turning off the respective light sources (step 105). The electric charge accumulation driving section 20 reads the afterglow electric charge accumulated in the electric charge accumulating section 14 in accordance with the second reading signal (step 106).

Then, the electric charge disposal section 21 disposes of the afterglow electric charge in the accumulation and afterglow electric charges read by the electric charge accumulation driving section 20 (step 107). In this way, a R-signal, a G-signal and a B-signal are sequentially obtained by reading the electric charge per light beam. That is, color signals are thus obtained.

Accordingly, the afterglow electric charges disappear, and the electric charges based on the lighting beams are read, whereby a sharp color image is obtainable.

<Embodiment 2>

Figure 3:
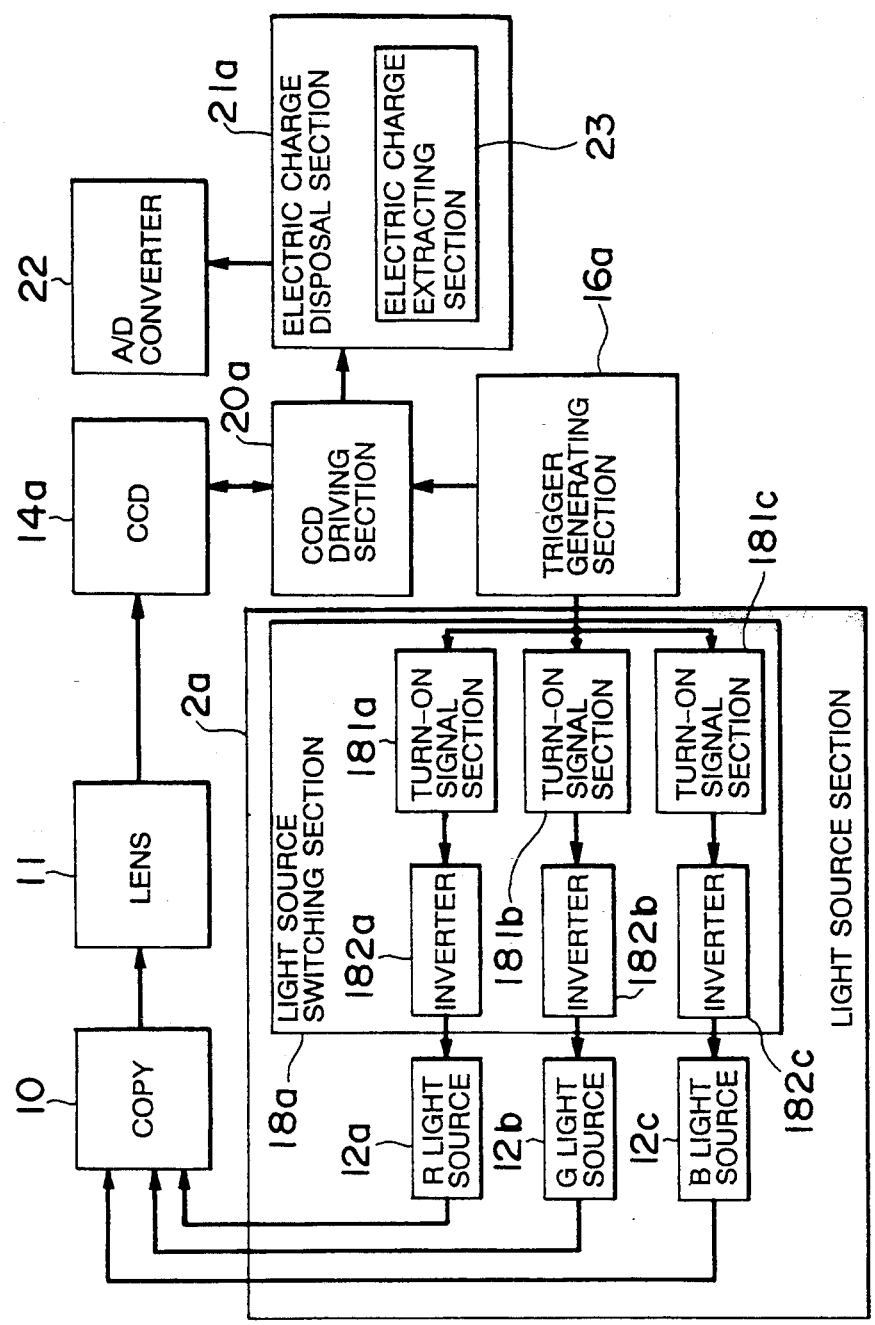
FIG. 3 is a block diagram illustrating a construction of the color reading apparatus in accordance with an embodiment 2 of this invention.
Figure 4:
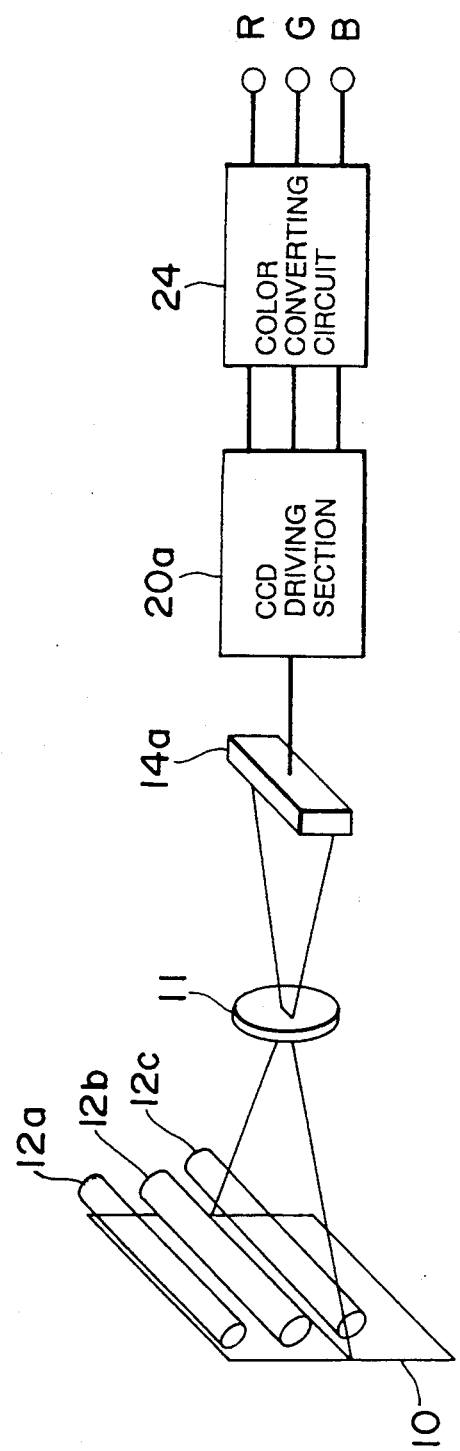
FIG. 4 is a view showing a portion peripheral to three light sources in an embodiment 2.

FIG. 3 is a block diagram illustrating a construction of a color reading apparatus in accordance with an embodiment 2 of this invention. FIG. 4 is a view showing a peripheral portion of the three light sources in the embodiment 2. The color reading apparatus includes a light source section 2a, the copy 10, a lens 11 and a CCD 14a. The color reading apparatus also has a trigger generating section 16a connected to the light source section 2a, a CCD driving section 20a connected to the trigger generating section 16a and to the CCD 14a and also an electric charge disposal section 21a connected to the CCD driving section 20a.

The light source section 2a effects irradiations and non-irradiations of the R light beam, the G light beam and the B light beam in sequence on the copy 10. The light source section 2a has the R light source 12a for irradiating the R light beam, the G light source 12b for irradiating the G light beam, the B light source 12c for irradiating the B light beam and a light source switching section 18a connected to these three light sources.

The light source switching section 18a sets a lighting time and an extinguishing time of each of the light sources 12a-12c and, at the same time, switches over the respective light sources in sequence. The light source switching section 18a sequentially turns on only one light source among the three light sources but is constructed so as not to simultaneously turn on the two light sources.

The light source switching section 18a includes three turn-on signal sections 181a-181c connected to the trigger signal section 16a and three inverters 182a-182c for connecting the corresponding light sources to the corresponding turn-on signal section. Each of the turn-on signal sections 18a-18c generates a turn-on signal for turning on the corresponding light source in synchronism with a pulse P1 of the trigger signal, which will be mentioned later. Each of the three inverters 182a-182c supplies the corresponding light source with the turn-on signal from the corresponding turn-on signal section.

Each of the three light sources 12a-12c is the rare gas fluorescent lamp which is excellent in terms of the rising characteristic and the temperature characteristic as well.

Each light source is provided between the copy 10 and the lens 11. The lens 11 converges the respective light beams reflected from the copy 10 at the CCD 14a. The CCD 14a, upon receiving the light beams reflected from the copy 10, accumulates the electric charges.

Figure 5:
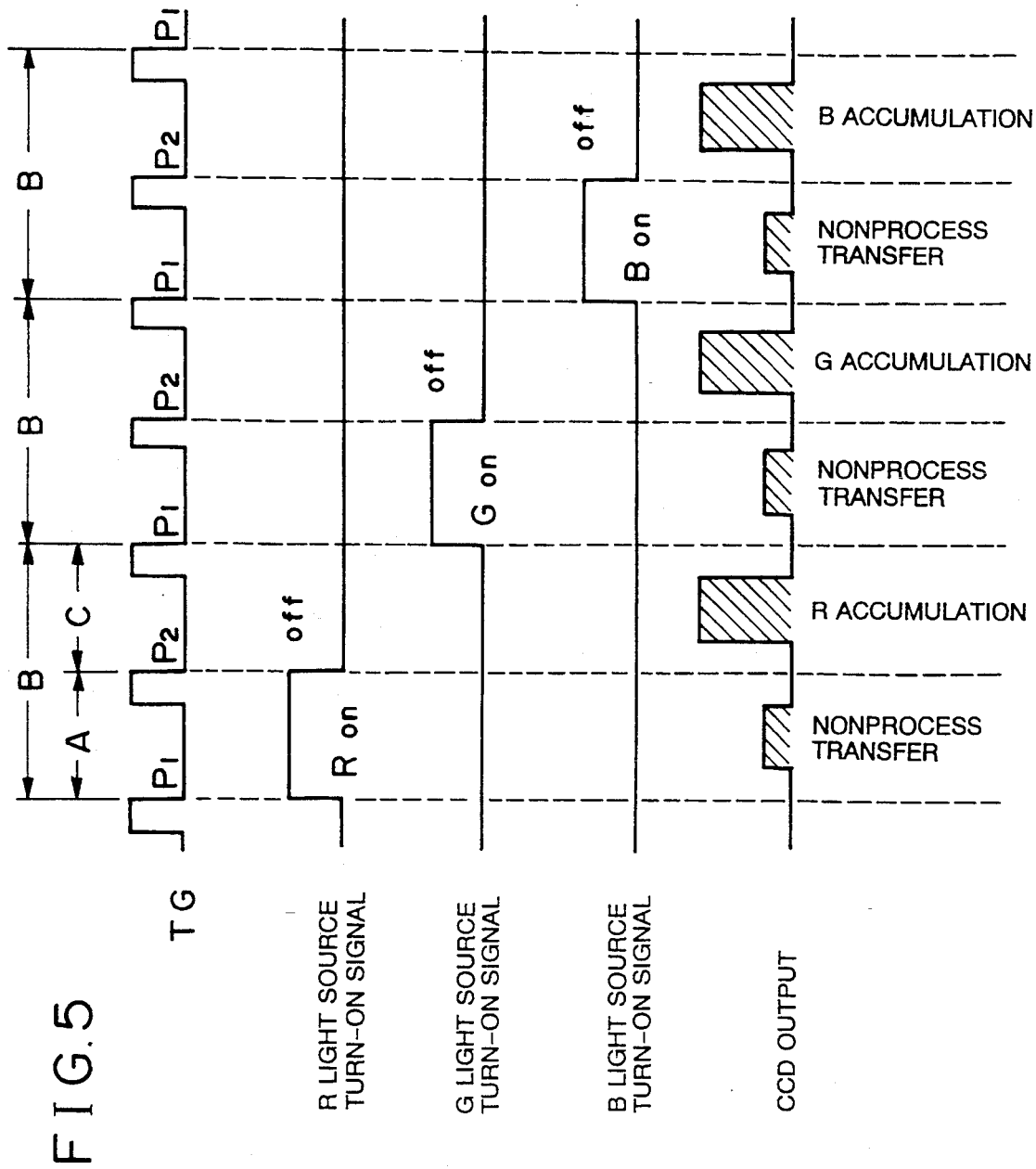
FIG. 5 is a timing chart showing a relationship between a light source turning-on action and an output of a CCD in the embodiment 2.

The trigger generating section 16a generates a trigger signal for reading the electric charges accumulated in the CCD 14a. This trigger generating section 16a generates a trigger signal TG. The trigger signal TG contains, as illustrated in FIG. 5, a pulse P2 (first reading signal) for reading the accumulation electric charge accumulated in the CCD through turning on each light source. The trigger signal TG further contains a pulse P1 (second reading signal) for reading the afterglow electric charge accumulated in the CCD 14a through turning off each light source. This trigger signal contains the pulse P1 and the pulse P2 per light source, and a lighting period B is set the same with respect to each light source.

A trailing edge of the pulse P2 synchronizes with a timing when turning off each light source in order to read the accumulation electric charge during the extinguishing time of the light source. A trailing edge of the pulse P1 synchronizes with a timing when turning on each light source in order to read the afterglow electric charge during the lighting time of the next light source.

A lighting time A of the light source is a time ranging from the trailing edge of the pulse P1 to the trailing edge of the pulse P2. The lighting time A is a time for which the CCD 14a actually accumulates the electric charge. An extinguishing time C of the light source is a time ranging from the trailing edge of the pulse P2 to the trailing edge of the pulse P1. This extinguishing time C is a time for accumulating the afterglow electric charge of the CCD 14a and the afterglow electric charges of the light sources 12a-12c.

The time C is set larger than a time taking a total bit number and a data transfer rate of the CCD 14a into consideration to exert no influence on the output data.

The CCD driving section 20a drives the CCD 14a in accordance with the trigger signal supplied from the trigger generating section 16a. The CCD driving section 20a outputs the accumulation electric charge in the form of a color signal to the electric charge disposal section 21a via an amplifying section (unillustrated) constructed of an OP amp. or the like. This CCD driving section 20a reads the accumulation electric charge during the extinguishing time of the light source by use of the pulse P2. The CCD driving section 20a also reads the afterglow electric charge during the lighting time of the next light source.

The electric charge disposal section 21a disposes of the afterglow electric charge in the accumulation electric charge and the afterglow electric charge which are read by the trigger signals generated by the trigger generating section 16a. The electric charge disposal section 21a includes an electric charge extracting section 23 for extracting, e.g., the accumulation electric charge in the afterglow electric charge and the accumulation electric charge.

An A/D converter 22 is connected to this electric charge disposal section 21a. The A/D converter 22 converts the color signal into a digital signal and supplies an unillustrated processing section with the digital output.

<Operation of the Embodiment 2>

FIG. 5 is a timing chart showing a relationship between an actual light source turning-on action and an output of the CCD in the embodiment 2. The operation of the embodiment 2 will be explained with reference to the drawings.

To start with, the trigger generating section 16a generates the trigger signal TG containing the pulse P1 and the pulse P2 per light source in order to read the electric charges accumulated in the CCD 14a.

Each of the turn-on signal sections 181a–181c generates the turn-on signal for turning on the corresponding light source in synchronism with the trailing edge of the pulse P1 from the trigger generating section 16a. That is, as illustrated in FIG. 5, the turn-on signal section 181a generates a R light source turn-on signal for turning on the R light source 12a first. The turn-on signal section 181b generates a G light source turn-on signal for turning on the G light source 12b second. The turn-on signal section 181c generates a B light source turn-on signal for turning on the B light source 12c third.

Next, the inverter 182a turns on the R light source 12a for only a time A by use of the R light source turn-on signal in synchronism with the pulse P1. Further, the inverter 182a turns off the light source 12a for only a time C in synchronism with the pulse P2.

Inputted, hereupon, via the lens 11 to the CCD 14a is the R light beam reflected from the copy 10 in the lighting beam during the lighting time of the R light source 12a and the afterglow beam during the extinguishing time thereof. The accumulation electric charge and the afterglow electric charge are accumulated in the CCD 14a by the lighting beam and the afterglow beams of the R light source 12a and of the CCD 14a.

Moreover, the CCD driving section 20a reads the afterglow electric charge which has already existed in the CCD 14a before turning on the light source 12a by use of the pulse P1 of the trigger signal. The CCD driving section 20a reads the accumulation electric charge of the R light source 12a which has been accumulated in the CCD 14a by using the pulse P2 of the trigger signal.

Further, the electric charge disposal section 21a disposes of the afterglow electric charge in the already-existing afterglow electric charge and the accumulation electric charge accumulated in the CCD 14a through the R light source 12a. The enhanced R signal is thereby obtained.

Next, the inverter 182b turns on the G light source 12b for only the time A by using the G light source turn-on signal in synchronism with the second pulse P1. The inverter 182b turns off the G light source 12b for only the time C in synchronism with the second pulse P2.

Inputted, hereupon, via the lens 11 to the CCD 14a is the G light beam reflected from the copy 10 in the lighting beam during the lighting time of the G light source 12b and the afterglow beam during the extinguishing time thereof. The accumulation electric charge and the afterglow electric charge are accumulated in the CCD 14a by the lighting beam and the afterglow beams thereof and of the CCD 14a.

At this time, the CCD driving section 20a reads the afterglow electric charge at the trailing edge of the second pulse P1 from the CCD 14a. Further, the CCD driving section 20a reads the accumulation electric charge through the G light source 12b at the trailing edge of the second pulse P2 from the CCD 14a.

Then, the electric charge disposal section 21a disposes of the afterglow electric charge in the accumulation electric charge accumulated in the CCD 14a through the G light source 12b and the afterglow electric charge accumulated in the CCD 14a through the R light source 12a. The enhanced G signal is thereby obtained.

Next, the inverter 182c turns on the B light source 12c for only the time A with the aid of the B light source turn-on signal in synchronism with the third pulse P1. The inverter 182c turns off the B light source 12c for only the time C in synchronism with the third pulse P2.

Inputted via the lens 11 to the CCD 14a is the B light beam reflected from the copy 10 in the lighting beam during the lighting time and the afterglow beam during the extinguishing time. The accumulation electric charge and the afterglow electric charge are accumulated in the CCD 14a by the lighting beam and the afterglow beam thereof and the afterglow beam of the CCD 14a.

At this time, the CCD driving section 20a reads the afterglow electric charge at the trailing edge of the third pulse P1 from the CCD 14a. Further, the CCD driving section 20a reads the accumulation electric charge through the B light source 12c at the trailing edge of the third pulse P2 from the CCD 14a.

Then, the electric charge disposal section 21a disposes of the afterglow electric charge in the accumulation electric charge accumulated in the CCD 14a through the B light source 12c and the afterglow electric charge accumulated in the CCD 14a through the G light source 12b. The enhanced B signal is thereby obtained. With the above operation, there is obtained a color signal consisting of the R signal, the G signal and the B signal.

As discussed above, in accordance with the embodiment 2, there are disposed of the afterglow electric charges relative to the afterglow beams of the light sources and the afterglow beam of the CCD 14a, and, therefore, only the accumulation electric charges are left. Namely, an accurate quantity-of-light output can be obtained, whereby the sharp color image can be also acquired.

<Embodiment 3>

Figure 6:
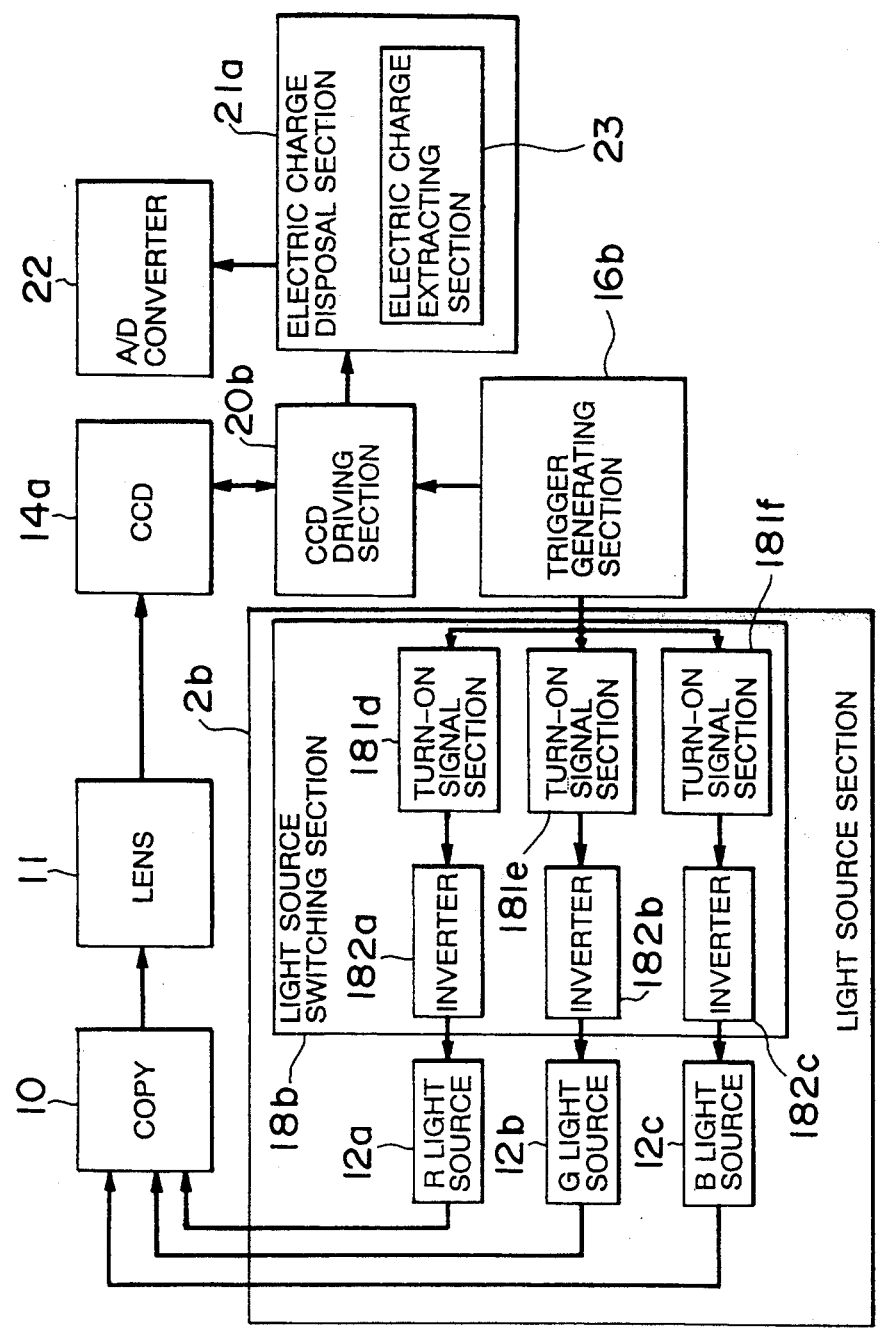
FIG. 6 is a block diagram illustrating a construction of the color reading apparatus in accordance with an embodiment 3 of the present invention.

FIG. 6 is a block diagram illustrating a construction of a color reading apparatus in accordance with an embodiment 3 of this invention. In accordance with the embodiment 3, the color reading apparatus has a light source section 2b, a trigger generating section 16b connected to the light source section 2b and a CCD driving section 20b connected to the trigger generating section 16b and to the CCD 14a.

The light source section 2b includes three light sources 12a–12c and the light source switching section 18b connected to these three light sources. The light source switching section 18b sequentially turns on only one light source among the three light sources but does not turn on the two light sources at the same time.

The light source switching section 18b has three turn-on signal sections 181d–181f and three inverters 182a–182c for connecting the corresponding light sources to the corresponding turn-on signal sections.

Figure 7:
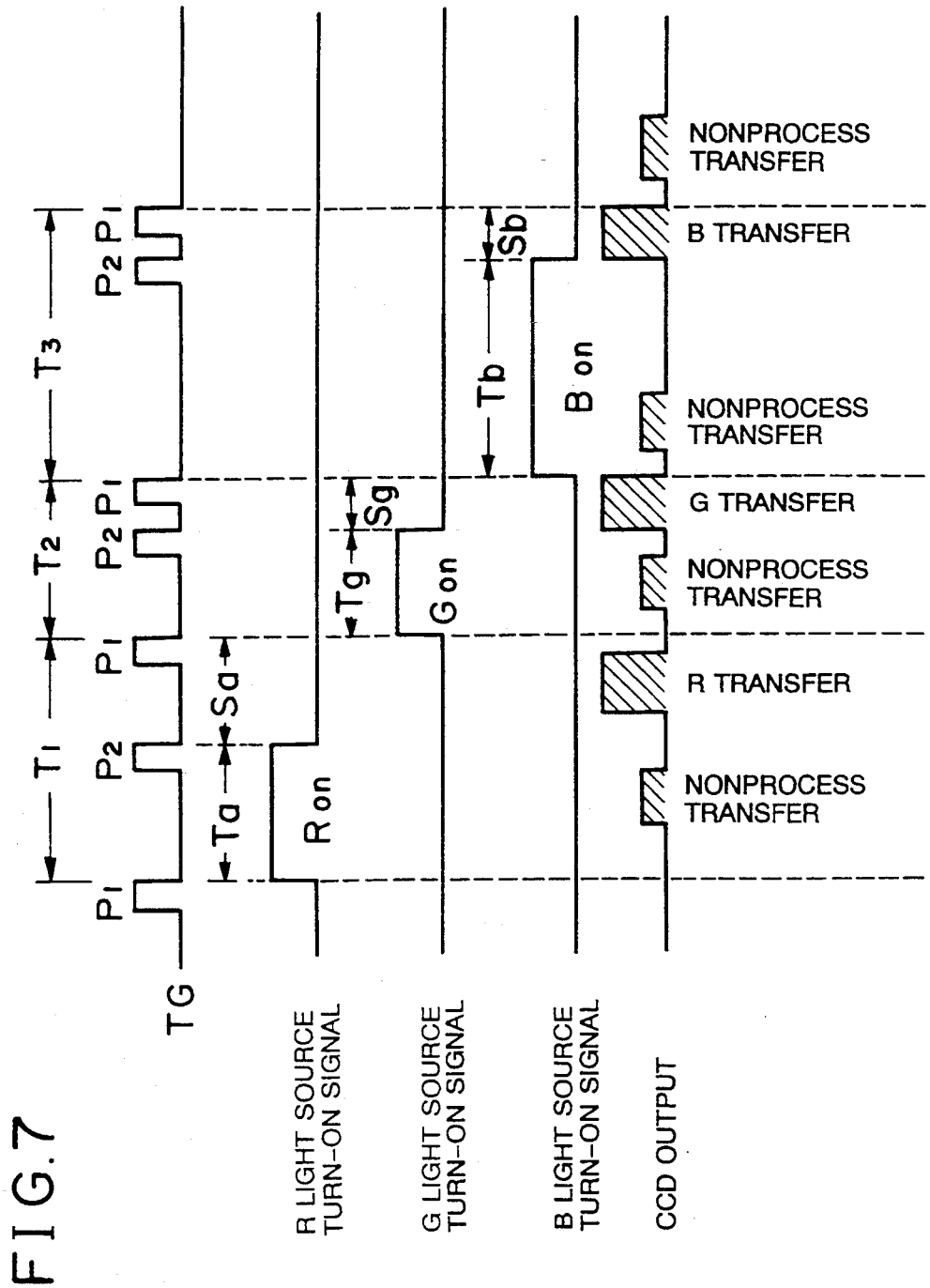
FIG. 7 is a timing chart showing a relationship between a light source turning-on action and an output of the CCD in the embodiment 3.

Each of the turn-on signal sections 181d–181f generates a turn-on signal for turning on the corresponding light source in synchronism with the pulse P1 of the trigger signal which will be mentioned later. Each of the turn-on signal sections 181d–181f generates a turn-on signal structured such that a light source lighting time is set in inverse proportion to an absolute light quantity of the corresponding light source as shown in FIG. 7.

The trigger generating section 16b generates a reading signal. The reading signal contains, as shown in FIG. 7, the pulse P2 for reading the accumulation electric charge of the CCD 14a by the turn-on of each of the above light sources and the pulse P1 for reading the afterglow electric charge of the CCD 14a by the turn-off of each of the light sources. This reading signal contains the pulse P1 and the pulse P2 per light source.

The CCD driving section 20b reads the accumulation electric charge during the extinguishing time of the light source by using the pulse P2 and reads the afterglow electric charge during the lighting time of the next light source by using the pulse P1.

Other configurations are the same as those in the embodiment 2, and, hence, their detailed explanations will be omitted.

<Operation of the Embodiment 3>

FIG. 7 is a timing chart showing a relationship between an actual light source turning-on action and an output of the CCD in the embodiment 3. The operation of the embodiment 3 will be explained with reference to the drawings.

To begin with, the trigger generating section 16b generates the trigger signal TG consisting of three periods T1, T2 and T3 as shown in FIG. 7 in order to read the electric charges accumulated in the CCD 14a. Setting of these three periods T1, T2 and T3 will hereinafter be stated.

Next, each of the turn-on signal sections 181d–181f generates a turn-on signal structured such that a lighting time arranged in inverse proportion to the absolute light quantity of the corresponding light source is set in synchronism with the trigger signal. The G light beam, the R light beam and the B light beam become larger in this sequence in terms of their normal light quantities of the three light sources. For instance, when it is assumed that the absolute light quantity of the G light source 12b is 1, the light quantity of the R light source 12a is 0.75 times as small as the light quantity of the G light source 12b. The light quantity of the B light source 12a is 0.5 times as small as the light quantity of the G light source 12b.

In this case, a lighting time Ta of the R light source 12a is expressed by the following formula:

$$Ta = Tg/0.75$$

A lighting time Tb of the B light source 12c is expressed by the following formula:

$$Tb = Tg/0.5$$

where Tg is the lighting time of the G light source 12b.

That is, the light quantity of each of the R light beam, the G light beam and the B light beam are set to a fixed quantity Referring to FIG. 7, the R light source turn-on signal turns on the R light source 12a for the lighting time Ta. The G light source turn-on signal turns on the G light source 12b for the lighting time Tg. The B light source turn-on signal turns on the B light source 12c for the lighting time Tb. Note that this coefficient differs depending on the light source and is therefore empirically determined.

Further, the light source switching section 18a determines a timing for turning off each light source on the basis of an afterglow time of each light source. The extinguishing time of each light source is set longer than the afterglow time of each light source. This intends to read all the afterglow electric charges produced due to the afterglow beams of the respective light sources out of the CCD 14a. For example, it is assumed that Dmsec is the afterglow time of the R light source, and the afterglow time of each of the G and B light sources is set 0.5 times as small as an afterglow time D.

In this instance, an extinguishing time Sa of the R light source is given by:

$$Sa = D + \alpha$$

An extinguishing time Sg of the G light source is given by:

$$Sg = D \times 0.5 + \alpha$$

An extinguishing time Sb of the B light source is also given by:

$$Sb = D \times 0.5 + \alpha$$

FIG. 7 shows the extinguishing times Sa, Sg and Sb. In the above equations, $\alpha$ is the constant taking a scatter in terms of the afterglow time of the fluorescent lamp into consideration. Normally, the constant $\alpha$ may be 0.1 through 0.3 times as small as D.

The light source switching section 18b takes a turn-on timing of each of the R, G and B light sources in synchronism with the trailing edge of the pulse P1 transmitted from the trigger generating section 16b.

That is, trigger periods when turning on the respective light sources are expressed such as:

$$T1 = Tg/0.75 + D + \alpha$$

$$T2 = Tg + D \times 0.5 + \alpha$$

$$T3 = Tg/0.5 + D \times 0.5 + \alpha$$

When the light source switching section 18b sets the lighting time and the extinguishing time per light source in this manner, first, the inverter 182a turns on the light source 12a for only the time Ta in synchronism with the pulse P1 but turns off the same light source for only the time Sa in synchronism with the pulse P2.

Inputted, hereupon, via the lens 11 to the CCD 14a is the R light beam reflected from the copy 10 in the lighting beam during the lighting time of the R light source 12a and the afterglow beam during the extinguishing time thereof. The electric charges are accumulated in the CCD 14a by the lighting beam and the afterglow beam.

Next, the inverter 182b turns on the light source 12b for only the time Tg in synchronism with the trigger signal T2 but turns off the same light source for only the time Sg.

The accumulation electric charges and the afterglow electric charges are accumulated in the CCD 14a by the lighting beam, the afterglow beam thereof and the afterglow beam of the CCD 14a.

Further, the CCD driving section 20b reads the afterglow electric charge which has already existed in the CCD 14a before turning on the light source 12a by using of the pulse P1 of the trigger signal. The CCD driving section 20b reads the accumulation electric charge of the R light source 12a which is accumulated in the CCD 14a by using the pulse P2 of the trigger signal.

Moreover, the electric charge disposal section 21a disposes of the afterglow electric charge in the already-existing afterglow electric charge and the accumulation electric charge accumulated in the CCD 14a through the R light source 12a.

Next, the inverter 182b turns on the G light source 12b for only the time Tg in synchronism with the second pulse P1 but turns off the same light source for only the time Sg in synchronism with the second pulse P2.

Inputted, hereupon, via the lens 11 to the CCD 14a is the light beam reflected from the copy 10 among the lighting beam during the lighting time of the G light source 12b and the afterglow beam during the extinguishing time thereof. The accumulation electric charge and the afterglow electric charge are accumulated in the CCD 14a by the lighting beam, the afterglow beam and the afterglow beam of the CCD 14a.

At this time, the CCD driving section 20b reads the afterglow electric charge at the trailing edge of the second pulse P1 from the CCD 14a. The CCD driving section 20b reads the accumulation electric charge through the G light source at the trailing edge of the second pulse P2 from the CCD 14a.

Then, the electric charge disposal section 21a disposes of the afterglow electric charge in the accumulation electric charge accumulated in the CCD 14a through the G light source 12b and the afterglow electric charge through the R light source 12a.

Next, the inverter 182c turns on the B light source 12c for only the time Tb in synchronism with the third pulse P1 but turns off the B light source 12c for only the time Sb in synchronism with the third pulse P2.

Inputted via the lens 11 to the CCD 14a is the light beam reflected from the copy 10 in the lighting beam during the lighting time of the B light source 12c and the afterglow beam during the extinguishing time thereof. The accumulation electric charge and the afterglow electric charge are accumulated in the CCD 14a by the lighting beam, the afterglow beam thereof and the afterglow beam of the CCD 14a.

At this time, the CCD driving section 20b reads the afterglow electric charge at the trailing edge of the third pulse P1 from the CCD 14a. The CCD driving section 20b also reads the accumulation electric charge through the B light source 12c at the trailing edge of the third pulse P2 from the CCD 14a.

Then, the electric charge disposal section 21a disposes of the afterglow electric charge in the accumulation electric charge accumulated in the CCD 14a through the B light source 12c and the afterglow electric charge through the G light source 12b.

As described above, in accordance with the embodiment 3 also, the same effects as those in the embodiment 2 are obtainable. Further, the same light quantity can be obtained with respect to the R light beam, the G light beam and the B light beam by changing the lighting time for each light source.

Note that there may be employed other turn-on signal section for obtaining the same light quantity with respect to the R light beam, the G light beam and the B light beam. This turn-on signal section sets, e.g., the turn-on period B shown in FIG. 5 to a fixed period with respect to each light source and changes a turn-on duty ratio (A/B) of each light source. When using this turn-on duty ratio, an afterglow output of the CCD 14a remains fixed. The afterglow output of the light source is, however, different per light source, and, therefore, the extinguishing time may be made as short as possible. If done so, the accurate data can be obtained, and, at the same time, the data can be also processed at a high speed.

<Embodiment 4>

Figure 8:
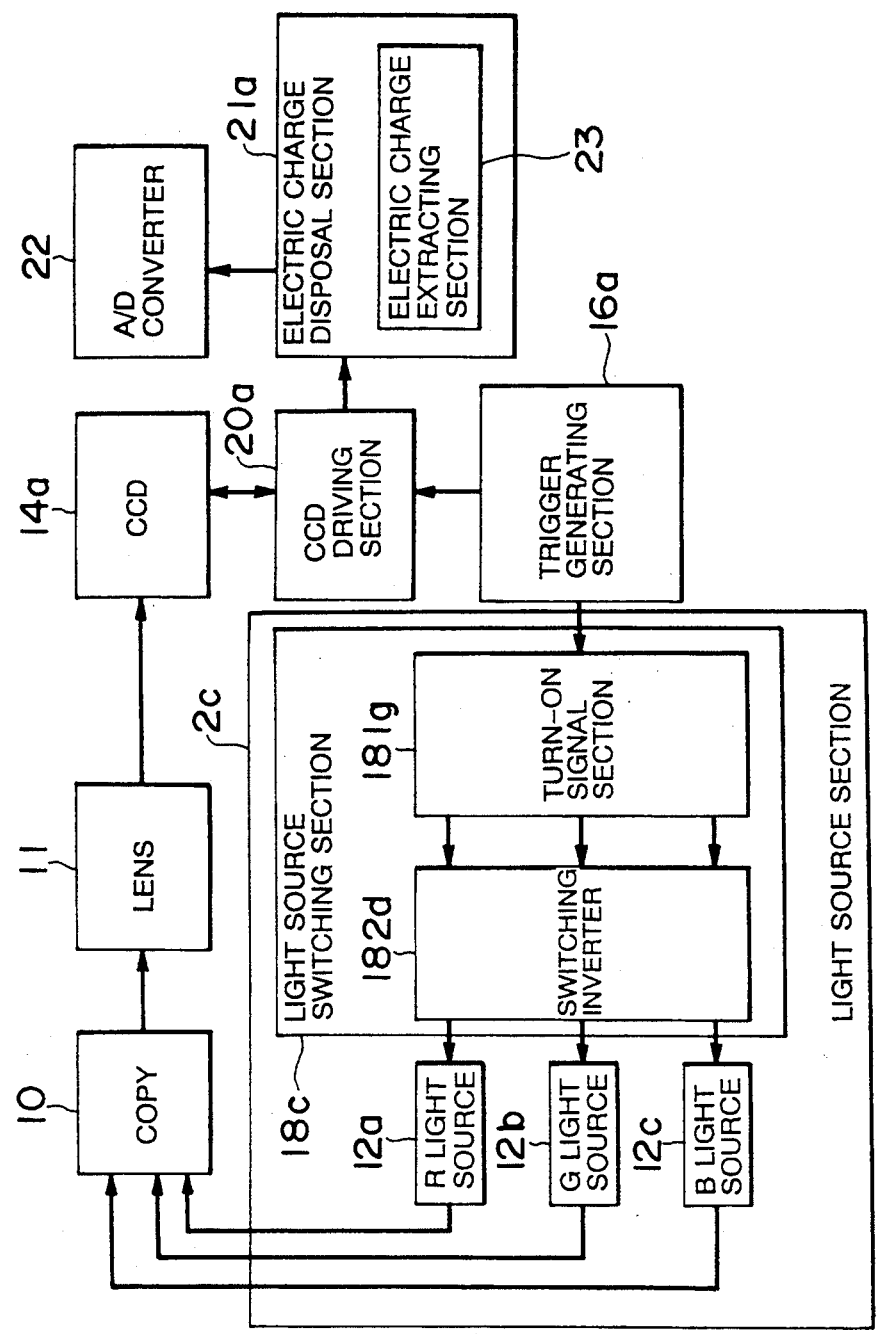
FIG. 8 is a block diagram showing a construction of the color reading apparatus in accordance with an embodiment 4 of this invention.

FIG. 8 is a block diagram illustrating a construction of the color reading apparatus in accordance with an embodiment 4. Referring to FIG. 8, a light source section 2c includes three light sources and a light source switching section 18c. The light source switching section 18c has a switching inverter 182d connected to three light sources 12a–12c. The light switching section 18c also has a turn-on signal section 181g connected to the switching inverter 182d.

Figure 9:
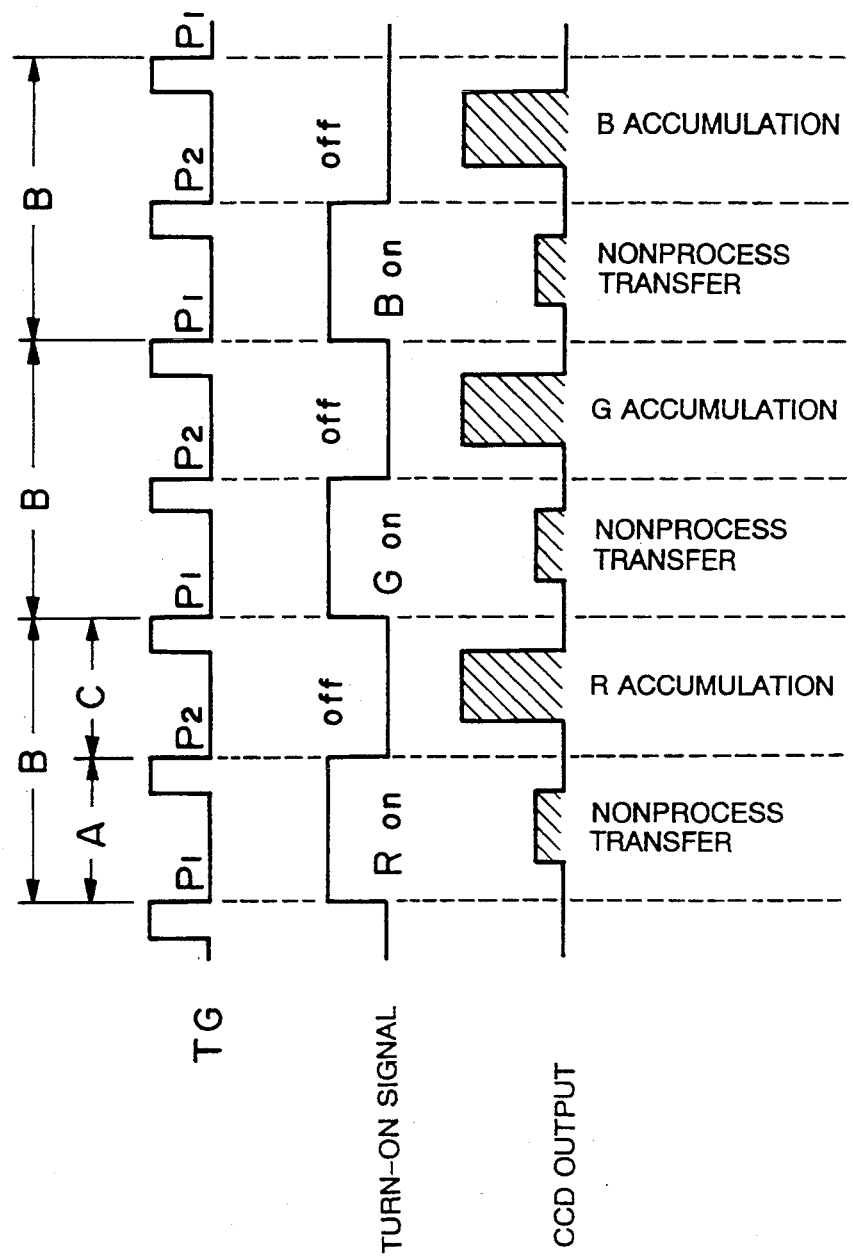
FIG. 9 is a timing chart showing a relationship between a light source turning-on action and an output of the CCD in the embodiment 4.

The turn-on signal section 181g generates a serial turn-on signal composed of continuous pulses for serially turning on the respective light sources in synchronism with the trigger signals TG as shown in FIG. 9. The switching inverter 182d supplies the continuous pulses of the serial turn-on signal to each of the light sources 12a–12c through a serial selection.

Note that other configurations are the same as those in the embodiment 2, and the explanation will be given while marking the same elements with the like symbols.

<Operation of the Embodiment 4>

FIG. 9 is a timing chart showing a relationship between an actual light source turning-on action and an output of the CCD in the embodiment 4. The operation of the embodiment 4 will be explained with reference to the drawings.

First, the trigger generating section 16a generates the trigger signal TG containing the pulse P1 and the pulse P2 per light source in order to read the electric charges accumulated in the CCD 14a.

The turn-on signal section 181g generates a serial turn-on signal composed of the continuous pulses for sequentially turning on the respective light sources in synchronism with the trailing edge of the pulse P1 transmitted from the trigger generating section 16a.

Next, the switching inverter 182d turns on the light source 12a for only the time A in synchronism with the pulse P1 but turns off the light source 12a in synchronism with the pulse P2.

Inputted, hereupon, via the lens 11 to the CCD 14a is the light beam reflected from the copy 10 in the lighting beam during the lighting time of the R light source 12a and the afterglow beam during the extinguishing time thereof. The accumulation electric charge and the afterglow electric charge are accumulated in the CCD 14a by the lighting beam, the afterglow beam thereof and the afterglow beam of the CCD 14a.

Moreover, the CCD driving section 20a reads the afterglow electric charge which has already existed in the CCD 14a before turning on the light source 12a by using of the pulse P1 of the trigger signal. The CCD driving section 20a also reads the accumulation electric charge of the R light source 12a which has been accumulated in the CCD 14a by using the pulse P2 of the trigger signal.

Further, the electric charge disposal section 21a disposes of the afterglow electric charge in the already-existing afterglow electric charge and the accumulation electric charge through the R light source 12a.

Next, the switching inverter 182d turns on the G light source 12b for only the time A in synchronism with the second pulse P1 but turns off the G light source 12b for only the time C in synchronism with the second pulse P2.

Inputted, hereupon, via the lens 11 to the CCD 14a is the light beam reflected from the copy 10 in the lighting beam during the lighting time of the G light source 12b and the afterglow beam during the extinguishing time thereof. The accumulation electric charge and the afterglow electric charge are accumulated in the CCD 14a by the lighting beam, the afterglow beam and the afterglow beam of the CCD 14a.

At this time, the CCD driving section 20a reads the afterglow electric charge at the trailing edge of the second pulse P1 from the CCD 14a. The CCD driving section 20a also reads the accumulation electric charge through the G light source at the trailing edge of the second pulse P2 from the CCD 14a.

Then, the electric charge disposal section 21a disposes of the afterglow electric charge in the accumulation electric charge through the G light source 12b and the afterglow electric charge through the R light source.

Next, the switching inverter 182d turns on the B light source 12c for only the time A in synchronism with the third pulse P1 but turns off the B light source 12c for only the time C in synchronism with the third pulse P2.

Inputted via the lens 11 to the CCD 14a is the light beam reflected from the copy 10 in the lighting beam during the lighting time and the afterglow beam during the extinguishing time. The accumulation electric charge and the afterglow electric charge are accumulated in the CCD 14a by the lighting beam, the afterglow beam and the afterglow beam of the CCD 14a.

At this time, the CCD driving section 20a reads the afterglow electric charge at the trailing edge of the third pulse P1 from the CCD 14a. The CCD driving section 20a also reads the accumulation electric charge through the B light source at the trailing edge of the third pulse P2 from the CCD 14a.

Then, the electric charge disposal section 21a disposes of the afterglow electric charge in the accumulation electric charge through the G light source and the accumulation electric charge through the B light source 12b.

As discussed above, in accordance with the embodiment 4, the same effects as those in the embodiment 2 are obtained. The light source switching section 18c is provided with only the single switching inverter 182d and the single turn-on signal section 181g. Hence, the construction is much simpler than the constructions in accordance with the embodiments 2 and 3.

<Embodiment 5>

Figure 10:
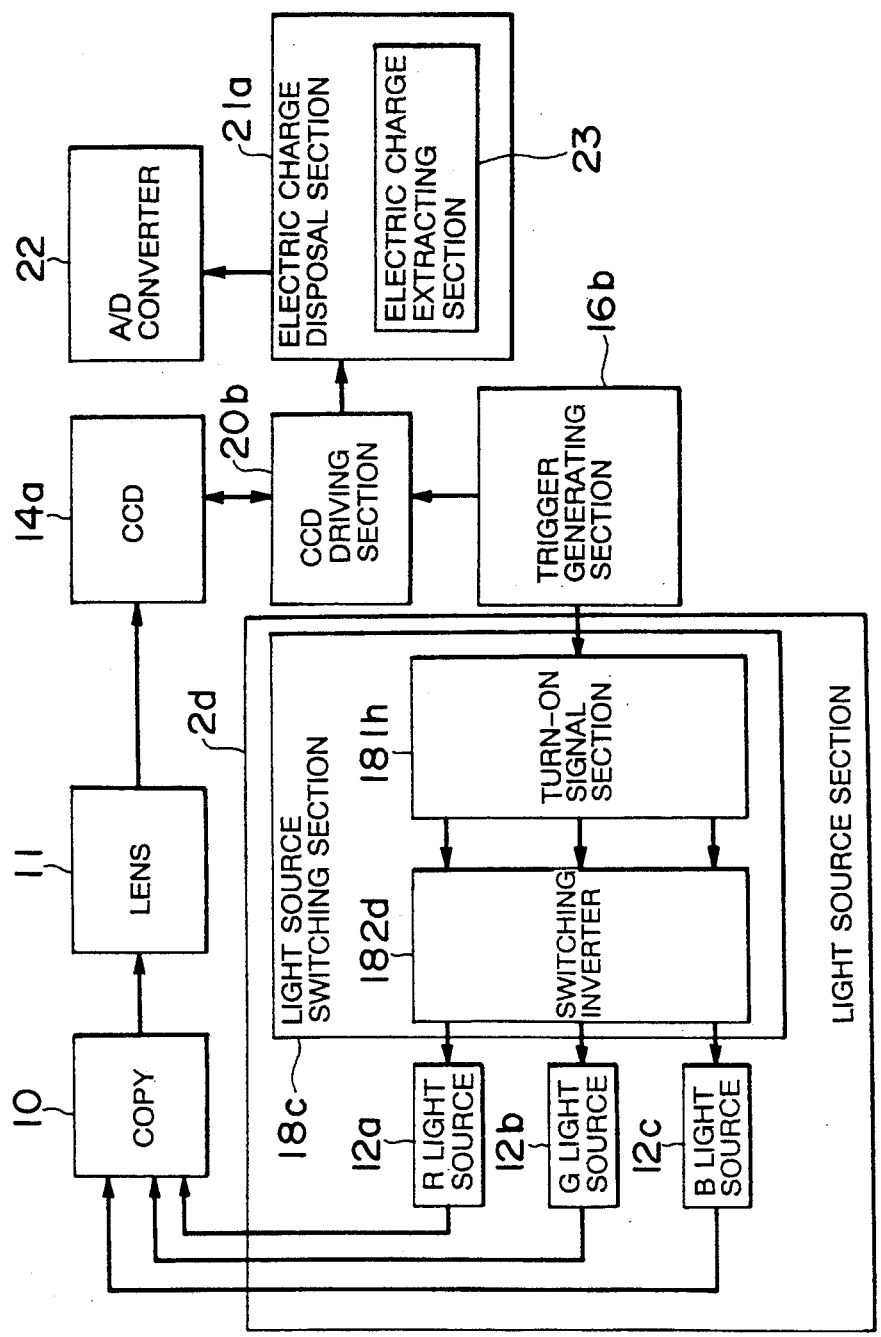
FIG. 10 is a block diagram illustrating a construction of the color reading apparatus in accordance with an embodiment 5 of this invention.

FIG. 10 is a block diagram illustrating a construction of an embodiment 5 of the present invention. The embodiment 5 is a combination of the constructions of the embodiments 3 and 4. The color reading apparatus includes a light source section 2d, the CCD driving section 20b and the trigger generating section 16b. The light source section 2d has a light source switching section 18d. The light source switching section 18d includes a switching inverter 182d and the turn-on signal section 181h.

The turn-on signal section 181h generates a serial turn-on signal structured such that the lighting time of each light source is set in inverse proportion to the absolute light quantity of each of the light sources 12a-12c.

Figure 11:
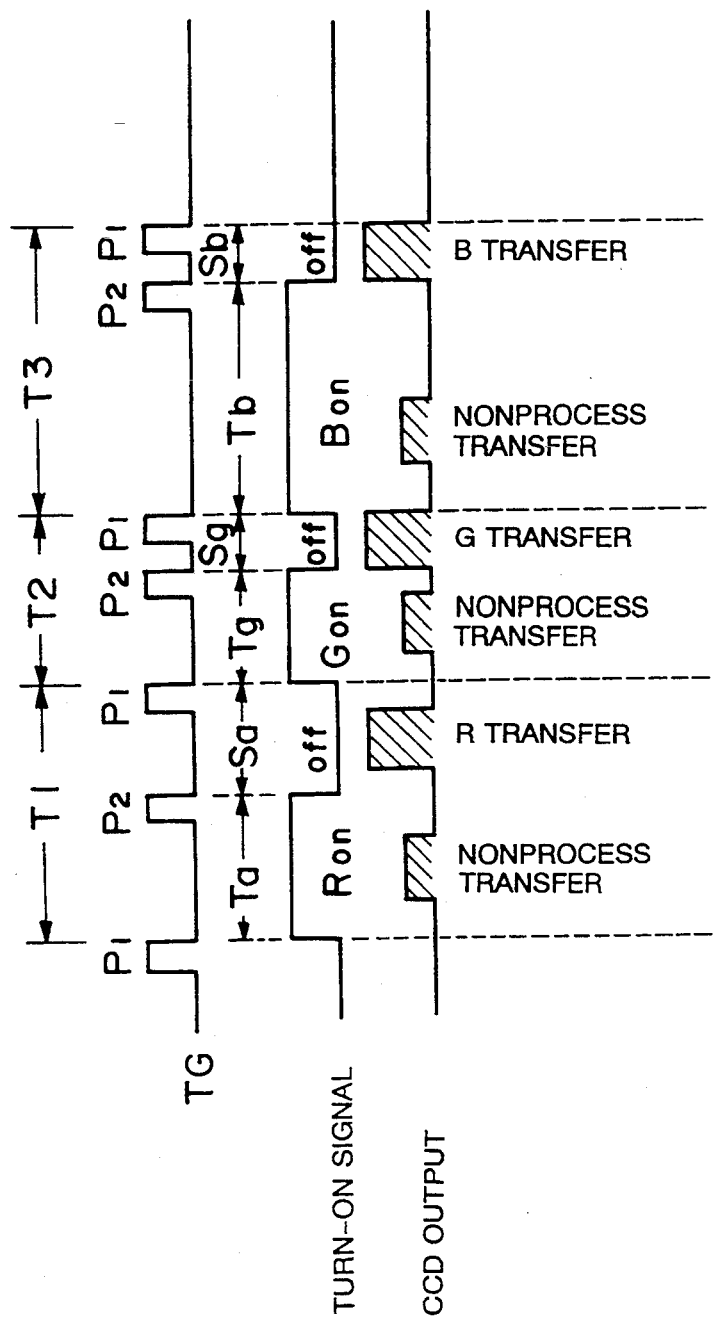
FIG. 11 is a timing chart showing a relationship between a light source turning-on action and an output of the CCD in the embodiment 5.

The trigger generating section 16b generates the trigger signal TG. The trigger signal TG contains, as shown in FIG. 11, the pulse P2 for reading the accumulation electric charge of the CCD 14a by the turn-on of each light source and the pulse P1 for reading the afterglow electric charge of the CCD 14a by the turn-off of each light source. This trigger signal contains the pulse P1 and the pulse P2 per light source. The trigger signal Tg is composed of three periods T1, T2 and T3.

The CCD driving section 20b reads the accumulation electric charge during the extinguishing time of the light source by using of the pulse P2. The CCD driving section 20b also reads the afterglow electric charge during the lighting time of the next light source by using the pulse P1.

Other configurations are the same as those in the embodiment 2, and therefore their detailed explanation will be omitted.

The construction being as described above, the embodiment 5 is capable of obtaining the effects of the embodiments 2 and 3.

It is apparent that, in this invention, a wide range of different working modes can be formed based on the invention without deviating from the spirit and scope of the invention. This invention is not restricted by its specific working modes except being limited by the appended claims.

What is claimed is:

1. A color reading apparatus comprising:
   light source means for effecting irradiations and non-irradiations of a R light beam, a G light beam and a B light beam in sequence;
   electric charge accumulating means for accumulating an electric charge per said light beam by receiving the respective light beams irradiated sequentially from said light source means;
   signal generating means for generating a first reading signal for reading the accumulated electric charge of said electric charge accumulating means during the irradiation of each said light beam and, at the same time, generating a second reading signal for reading an afterglow electric charge of said electric charge accumulating means during the non-irradiation of each said light beam; and
   electric charge disposal means for disposing the afterglow electric charge read by the second reading signal generated by said signal generating means.

2. A color reading apparatus according to claim 1, wherein said light source means includes a R light source for irradiating the R light beam, a G light source for irradiating the G light beam, a B light source for irradiating the B light beam and light source switching means for setting a lighting time and an extinguishing time of each of said light sources and, at the same time, sequentially switching over said respective light sources.

3. A color reading apparatus according to claim 2, wherein said light source switching means sets longer the lighting time of each of said light sources as an absolute light quantity of each of said light sources decreases.

4. A color reading apparatus according to claim 2, wherein said light source switching means sets the lighting times of said respective light sources to the same value and thereby sets a duty ratio of the lighting time with respect to a total sum of the lighting times and the extinguishing times of said respective light sources in accordance with each of said light sources.

5. A color reading apparatus according to claim 2, wherein said light source switching means includes:
turn-on signal means for generating a turn-on signal composed of continuous pulses for sequentially turning on said respective light sources in synchronism with the second reading signal; and
selecting means for sequentially selecting the continuous pulses of the turn-on signal generated by said turn-on signal means and supplying each of said light sources with the continuous pulses.

6. A color reading apparatus according to claim 2, wherein said light source switching means includes:
three turn-on signal means, provided corresponding to said three light sources, for generating turn-on-signals for turning on said corresponding light sources in synchronism with the second reading signal; and
three turn-on means provided corresponding to said three turn-on signal means, for supplying said corresponding light sources with the turn-on signals from said corresponding turn-on signal means.

7. A color reading apparatus according to claim 1, wherein said electric charge disposal means includes electric charge extracting means for extracting the accumulation electric charge read by the first reading signal generated by said signal generating means.

8. A color reading apparatus according to claim 2, wherein the first reading signal synchronizes with a timing for turning off each of said light sources to read the accumulated electric charge during the extinguishing time of each of said light sources, and the second reading signal synchronizes with a timing for turning on each of said light sources to read the afterglow electric charge during the lighting time of a next light source of said sequentially switched over respective light sources.

9. A color reading apparatus according to claim 8, further comprising:
electric charge accumulation driving means for reading the electric charge during the extinguishing time of each of said light sources by using the first reading signal and reading the afterglow electric charge during the lighting time of said next light source by using the second reading signal.

10. A color reading apparatus according to claim 2, wherein said light source switching means determines the timing for turning off each of said light sources in accordance with an afterglow time of each of said light sources.

11. A color reading apparatus according to claim 2, wherein said light source switching means includes:
turn-on signal means for generating a turn-on signal composed of continuous pulses for sequentially turning on each of said light sources in synchronism with the second reading signal and, at the same time, setting a width of each of said continuous pulses to make longer the lighting time of each of said light sources as the absolute light quantity of each of said light sources decreases; and
selecting means for sequentially selecting the continuous pulses of the turn-on signal generated by said turn-on signal means and supplying each of said light sources with the continuous pulses.

12. A color reading apparatus according to claim 11, wherein said light source switching means determines a timing for turning off each of said light sources in accordance with an afterglow time of each of said light sources.

13. A color reading method comprising:
a light source step of effecting irradiations and non-irradiations of a R light beam, a G light beam and a B light beam in sequence;
an electric charge accumulating step of accumulating an electric charge per said light beam by receiving the respective light beams irradiated in sequence;
a signal generating step of generating a first reading signal for reading the accumulated electric charge during the irradiation of each said light beam and, at the same time, generating a second reading signal for reading an afterglow electric charge during the non-irradiation of each said light beam; and
an electric charge disposal step of disposing the afterglow electric charge read by the second reading signal.

14. A color reading method according to claim 13, wherein said light source step includes a light source switching step of setting a lighting time and an extinguishing time of each of a R light source, a G light source and a B light source and sequentially switching over said respective light sources.

15. A color reading method according to claim 14, wherein said light source switching step is to set longer the lighting time of each of said light sources as an absolute light quantity of each of said light sources decreases.

16. A color reading method according to claim 14, wherein said light source switching step is to set the lighting times of said respective light sources to the same value and to thereby set a duty ratio of the lighting time with respect to a total sum of the lighting times and the extinguishing times of said respective light sources in accordance with each of said light sources.

17. A color reading method according to claim 14, wherein said light source switching step includes:
a turn-on signal step of generating a turn-on signal composed of continuous pulses for sequentially turning on said respective light sources in synchronism with the second reading signal; and
a selecting step of sequentially selecting the continuous pulses of the turn-on signal generated and supplying each of said light sources with the continuous pulses 18. A color reading method according to claim 14, wherein said light source switching step includes:
a three turn-on signal step of generating three turn-on-signals corresponding to said three light sources in synchronism with the second reading signal; and
a turn-on step of supplying said corresponding light sources with the respective turn-on signals.

19. A color reading method according to claim 13, wherein said electric charge disposal step includes an electric charge extracting step of extracting the accumulation electric charge read by the first reading signal generated.

20. A color reading method according to claim 14, wherein the first reading signal synchronizes with a timing for turning off each of said light sources to read the accumulated electric charge during the extinguishing time of each of said light sources, and the second reading signal synchronizes with a timing for turning on each of said light sources to read the afterglow electric charge during the lighting time of a next light source of said sequentially switched over respective light sources.

21. A color reading method according to claim 20, further comprising:

a step of reading the electric charge during the extinguishing time of each of said light sources by using the first reading signal and reading the afterglow electric charge during the lighting time of said next light source by using the second reading signal.

22. A color reading method according to claim 14, wherein said light source switching step is to determine the timing for turning off each of said light sources in accordance with an afterglow time of each of said light sources.

23. A color reading method according to claim 14, wherein said light source switching step includes:

a turn-on signal step of generating a turn-on signal composed of continuous pulses for sequentially turning on each of said light sources in synchronism with the second reading signal and, at the same time, setting a width of each of said continuous pulses to make longer the lighting time of each of said light sources as the absolute light quantity of each of said light sources decreases; and a selecting step of sequentially selecting the continuous pulses of the turn-on signal generated and supplying each of said light sources with the continuous pulses.

24. A color reading method according to claim 23, wherein said light source switching step is to determine a timing for turning off each of said light sources in accordance with an afterglow time of each of said light sources.

* * * * *